US011281172B1

(12) United States Patent
Kalm et al.

(10) Patent No.: US 11,281,172 B1
(45) Date of Patent: Mar. 22, 2022

(54) INVENTORY HANDLING APPARATUS (71) Applicant: Amazon Technologies, Inc., Seattle, WA (US)

(72) Inventors: William Scott Kalm, Seattle, WA (US); Peter A. Grant, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 457 days.

(21) Appl. No.: 16/444,502

(22) Filed: Jun. 18, 2019

(51) Int. Cl.
*G05B 19/042* (2006.01)

(52) U.S. Cl.
CPC .... *G05B 19/042* (2013.01); *G05B 2219/2621* (2013.01)

(58) Field of Classification Search
None
See application file for complete search history.

(56) References Cited

U.S. PATENT DOCUMENTS 5,100,265 A * 3/1992 Mirkin ................ B65G 51/035
406/79
10,737,403 B2 * 8/2020 Bauer .................. B65G 47/682

FOREIGN PATENT DOCUMENTS

JP          2012096888 A  *  5/2012
KR         100922610 B1  *  10/2009

* cited by examiner

*Primary Examiner* — Mohammad Ali
*Assistant Examiner* — Joshua T Sanders
(74) *Attorney, Agent, or Firm* — Kilpatrick Townsend & Stockton LLP (57) ABSTRACT

An inventory handling apparatus for transferring inventory items from an inventory bin onto a conveyer includes a rotatable member with a conveyance assembly mounted inside. The conveyance assembly receives an inventory bin into a conveyance channel sized to restrain the inventory bin during inversion of the inventory bin. The inverted inventory bin is moved onto a conveyor and the inventory bin lifted thereby leaving the inventory items on the conveyor.

19 Claims, 5 Drawing Sheets

INVENTORY HANDLING APPARATUS

BACKGROUND

Automatic packaging systems generally require items associated with an order to be transferred from a storage area to a packaging area and fed into an automatic packaging device. For orders that contain multiple items, the items must be collected from the storage area, grouped together and transferred to the packaging area. In some existing approaches, the group of items are manually fed into the automatic packaging device. Manually feeding items into the automatic packaging device, however, may result in one or more items being omitted or the inclusion of one or more items from another order. Additionally, manually feeding items into the automatic packaging device may inhibit operation of the automatic packing device at full capacity.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory handling apparatus operable to transfer one or more inventory items from an inventory bin onto a conveyor, which can then deliver the items to an automatic packing device. In some embodiments, an inventory handling apparatus is configured to receive an inventory bin that contains one or more inventory items, restrain and rotate the inventory bin, transport the rotated inventory bin to an output conveyor, and lift the rotated inventory bin so as to leave the one or more items on the output conveyor. In various embodiments, the one or more items in the inventory bin can be associated with an online order received from a purchaser. For example, a purchaser can place an online order for one or more items. The purchased items can be found in a warehouse and placed in an inventory bin. The inventory bin can be fed into the inventory handling apparatus, where it is rotated and the purchaser's items are deposited onto the output conveyor. In some embodiments, the inventory handling apparatus can include an outer conveyance channel for returning the empty inventory bin for reuse. For example, after the inventory bin has been emptied of items, the outer conveyance channel can move the inventory bin toward a location where the empty inventory bin can be refilled with additional items.

Turning now to an illustrative example, in response to an order being received from an online purchaser, the purchased item(s) is located in a storage area and collected. The collected item(s) is placed into an inventory bin. The inventory bin containing the item(s) is placed onto a conveyor and transported to the inventory handling apparatus. The inventory handling apparatus receives the inventory bin into a channel of the inventory handling apparatus. The channel is sized to restrain the inventory bin during rotation of the inventory bin by the inventory handling apparatus. The inventory handling apparatus rotates the restrained inventory bin to invert the inventory bin. The inverted inventory bin and the item(s) is transported out of the channel and onto an item conveyor. The inverted inventory bin is lifted by a bin lifting device so as to leave the item(s) on the item conveyor. The bin lifting device transfers the empty inventory bin to the outer conveyance channel, which returns the empty inventory bin for reuse.

Figure 1:
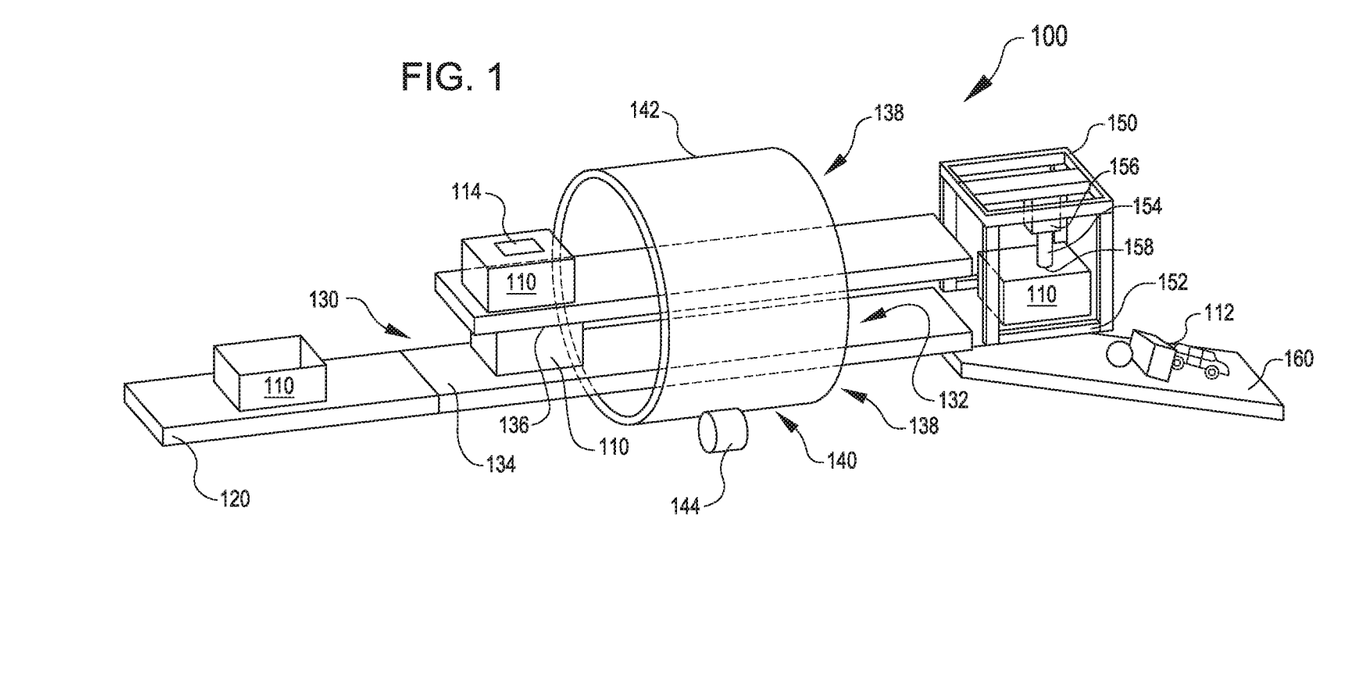
FIG. 1 illustrates an inventory handling apparatus that includes a conveyance assembly and rotatable member for moving and rotating inventory bins according to various embodiments.

Referring now to the drawings in which like-referenced numerals and/or names may refer to like elements, FIG. 1 illustrates an inventory handling apparatus 100 for moving and rotating inventory bins 110 according to various embodiments. The inventory handling apparatus 100 can include one or more inventory bins 110, a feeder conveyor 120, a conveyance mechanism 130, a rotatable member 140, and an inventory bin lift assembly 150. However, the inventory handling apparatus 100 may include additional or alternative components capable of rotating and/or moving the inventory bins 110.

In operation, the inventory bin 110 can be filled with inventory items 112 and transported via the feeder conveyor 120 to the conveyance mechanism 130. The conveyance mechanism 130 can be mounted in the rotatable member 140 and restrain the inventory bin 110 during rotation. The rotatable member 140 can rotate from a first orientation to a second orientation, inverting the inventory bin 110. The conveyance mechanism 130 can transport the inverted inventory bin 110 out of the rotatable member 140 to an inventory bin lift 150. The inventory bin lift 150 can support the inventory bin 110 while the inventory items 112 remain on the conveyance mechanism 130. The conveyance mechanism 130 can transfer the inventory items 112 onto an item conveyor 160.

The inventory bin 110 can be a bin for holding one or more inventory items 112. The inventory bin 110 can include a base with walls extending from the base to form a bin with an open side for receiving the one or more inventory items 112. In various embodiments, the inventory bin 110 can be a bin with four walls, a closed bottom, and an open top. However, the inventory bin 110 may be a box, a tote, or another semi-rigid container capable of holding one or more items 112 and retaining its shape while being rotated. In some embodiments, the inventory bin 110 may include an attachment area 114 for connecting with the inventory bin lift assembly 150. The attachment area may include a ring, a clip, a magnetic plate, and/or an adhesive area.

The one or more inventory items 112 can be goods or inventory purchasable by a purchaser. In various embodiments, the inventory items 112 may be ordered by a purchaser through an online portal. For example, the inventory items 112 may be a plastic action figure, a dog toy, or a watch purchased through the online portal. The items 112 can be grouped together and placed into an inventory bin 110 at the same time. Additionally or alternatively, individual inventory items 112 can be placed into the inventory bin 110 one by one. In some embodiments, one inventory item 112 may be placed into a single inventory bin 110.

The feeder conveyor 120 can transport the inventory bins 110 from a warehouse environment to the conveyance mechanism 130. In some embodiments, the inventory bins 110 can be placed on the feeder conveyor 120 before the inventory items 112 are placed in the inventory bins 110. The inventory items 112 can then be placed in the inventory bins 110 as they are transported to the conveyance mechanism 130. Additionally or alternatively, the inventory bins 110 can be filled with inventory items 112 before the inventory bins 110 are placed on the feeder conveyor 120.

In some embodiments, the feeder conveyor 120 may be connected with a conveyance assembly that transports the empty inventory bins 110 away from the inventory bin lift 150. As an illustrative example, the empty inventory bins 110 are transported from the inventory bin lift 150 to the feeder conveyor 120. Inventory items 112 can then be added to the inventory bin 110 and the inventory bin 110 can be transported to the conveyance mechanism 130.

The feeder conveyor 120 can correspond to or comprise components of a belted motor driven roller assembly. Additionally or alternatively, the feeder conveyor 120 may correspond to or comprise components of motor driven rollers, a conveyor, a robot, a drone, and/or other devices suitable for transporting inventory bins 110.

The conveyance mechanism 130 can be mounted in the rotatable member 140 and include an inner conveyance channel 132 for receiving inventory bins 110 from the feeder conveyor 120. The inner conveyance channel 132 can transport the inventory bins 110 through the rotatable member 140 and prevent the inventory items 112 from falling out of the inventory bins 110 during rotation of the rotatable member 140. The inner conveyance channel 132 can include a first surface 134 and a second surface 136. The first surface 134 can contact the base of the inventory bin 110 and the second surface 136 can contact the open side of the inventory bin 110. The second surface 136 can enclose the open side of the inventory bin 110 and prevent inventory items 112 from falling out of the inventory bin 110 when the inventory bin 110 is inverted. In some embodiments, the inner conveyance channel 132 includes two belted motor driven roller assemblies (e.g., one at the first surface 134 and one at the second surface 136). The two belt assemblies can be spaced apart at a distance to accept the inventory bin 110. The inner conveyance channel 132 may correspond to or comprise belted motor drive rollers, beltless motor drive rollers, and/or components similar to those used in the feeder conveyor 120.

In various embodiments, the first surface 134 and the second surface 136 can work together to move the inventory bin 110 through the rotatable member 140. However, one surface (e.g., the first surface 134) may move the inventory bin 110 while the other surface (e.g., the second surface 136) provides passive support.

The inner conveyance channel 132 can transport the inventory bin while the rotatable member 140 is rotating. For example, the rotatable member 140 can start to rotate from a first orientation when the inventory bin 110 is received in a first end of the inner conveyance channel 132. The rotatable member 140 can rotate while the inner conveyance channel 132 moves the inventory bin 110 from the first end to a second end of the inner conveyance channel 132. In some embodiments, the rotatable member 140 reaches a second orientation before and/or at the same time the inventory bin 110 reaches the second end of the inner conveyance channel 132.

In various embodiments, the inner conveyance channel 132 holds the inventory bin 110 in place as the rotatable member 140 rotates. For example, the inner conveyance channel 132 can receive and transport the inventory bin 110 to a location within the rotatable member 140. The inner conveyance channel 132 can stop and hold the inventory bin 110 in place and the rotatable member 140 can rotate from a first orientation to a second orientation. After the rotatable member 140 has rotated, the inner conveyance channel 132 can continue to move the inventory bin 110.

In various embodiments, the conveyance mechanism 130 includes one or more outer conveyance channels 138. The outer conveyance channels 138 can transport the empty inventory bins 110 between the drum 142 and the inner conveyance channel 132. The outer conveyance channels 138 can receive the empty inventory bin 110 from the inventory bin lift 150 and transport it through the rotatable member 140. The outer conveyance channels 138 can be coupled with the inner conveyance channel 132. For example, a first outer conveyance channel 138 can be coupled with the first surface 134 and a second outer conveyance channel 138 can be coupled with the second surface 136.

In various embodiments, the first surface 134 and an outer conveyance channel 138 can be part of the same conveyance device and/or the second surface 136 and an outer conveyance channel 138 can be part of the same conveyance device. For example, the first surface 134 can be a first side of a belted motor driven roller assembly and the outer conveyance channel 138 can be the opposite side of the belted motor driven roller assembly. Additionally or alternatively, the outer conveyance channel 138 may be a separate conveyance device from the inner conveyance channel 132. For example, the outer conveyance channel 138 is a first belted motor driven roller assembly and the inner conveyance channel 132 is a second belted motor driven roller assembly.

The rotatable member 140 can include a drum 142 and motor 144 for driving rotation. The motor 144 can be in direct contact with the drum 142 to cause rotation and/or the motor 144 may be connected with the drum 142 via a driving assembly. For example, the motor 144 may rotate the drum 142 via a driving cable system.

The inventory bins 110 can be transported from the inner conveyance channel 132 to the inventory bin lift assembly 150 (hereinafter referred to as the "lift assembly"). In various embodiments, the lift assembly 150 includes bin supports 152, a vertical lift 154, and a horizontal mover 156. The bin supports 152 can receive the inventory bin 110 from the inner conveyance channel 132 and support the edges of the inventory bin 110. The lift assembly 150 can support the inventory bin 110 while the inventory items 112 remain on the inner conveyance channel 132. The inner conveyance channel 132 can transport the inventory items 112 onto an item conveyor 160.

The vertical lift 154 can connect to and move the inventory tray 110 from the bin supports 152 to the outer conveyance channel 138. The vertical lift 154 can correspond to or comprise, a pneumatic cylinder. The vertical lift 154 may also be a robotic arm, elevator and/or a conveyor.

In some embodiments, the vertical lift 154 can include a coupler 158 for engaging with the inventory bin 110. The coupler 158 may engage with the connection point of the inventory bin 110. In various embodiments, the coupler 158 can be a suction cup, for example, a pneumatic suction cup. Additionally or alternatively, the coupler 158 may correspond to or comprise a ring, a magnet, a clip, and/or an adhesive pad.

In various embodiments, the lift assembly 150 may include a horizontal mover 156. The horizontal mover 156 can move the vertical lift 154 along a horizontal axis. In some embodiments, the horizontal mover 156 can move the vertical lift 154 when it is attached to an inventory bin 110. The horizontal mover 156 can be a linear actuator.

In various embodiments, the inventory handling apparatus 100 can include an item removal conveyor 160 for receiving the inventory items from the inner conveyance channel 132. The item removal conveyor 160 may contain structure keeping the inventory items 112 grouped. In some embodiments, the item removal conveyor 160 includes belted motor driven rollers. The item removal conveyor 160 may correspond to or include a declining indexing conveyor, a conveyor belt, and/or a conveyor with spacers.

In some embodiments, the item removal conveyor 160 can transport the inventory items 112 to a packaging machine. For example, the item removal conveyor 160 can receive inventory items 112 that have fallen out of the inventory bin 110 and transport them to a smartpac packing device. In some embodiments, the item removal conveyor 160 may transport the inventory items 112 to another station in a packing system, another part of a storage warehouse, and/or to be deposited into additional bins.

Figure 2:
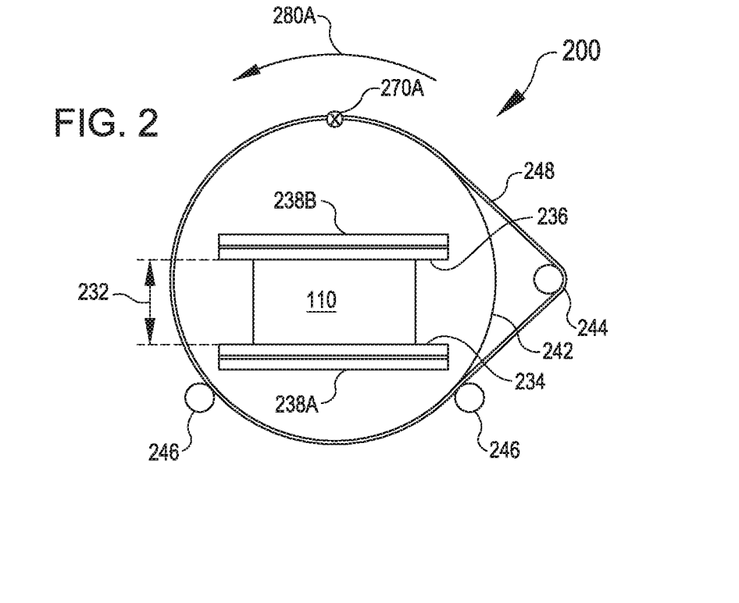
FIG. 2 and FIG. 3 are end views of an example rotatable member that may be utilized in particular embodiments of the inventory handling apparatus shown in FIG. 1.
Figure 3:
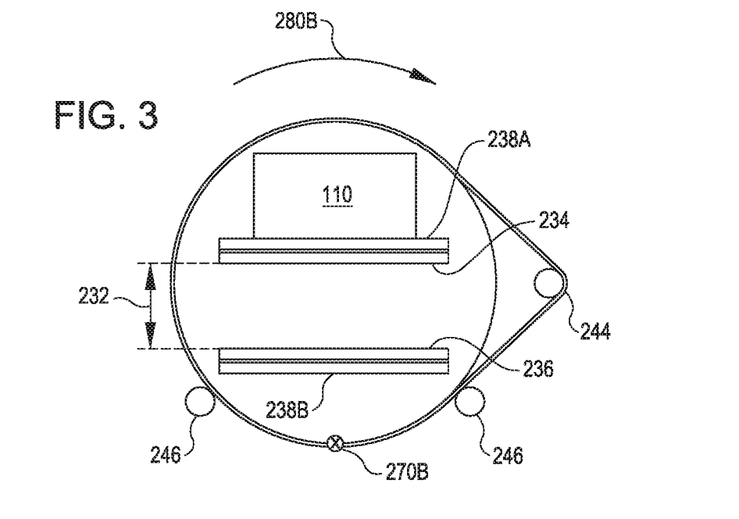

FIG. 2 and FIG. 3 are end views of an example rotatable member 200 that may be utilized in particular embodiments of the inventory handling apparatus 100 of FIG. 1. The rotatable member 200 includes a conveyance mechanism 230 mounted in the rotatable member 200. The conveyance mechanism 230 includes an inner conveyance channel 232 with a first surface 234 and a second surface 236. One or both of the surfaces can correspond to or comprise belted motor driven rollers. The conveyance mechanism 230 includes a first outer conveyance channel 238A and a second outer conveyance channel 238B. The outer conveyance channels 238A and 238B are between the drum 242 and the inner conveyance channel 232. The first outer conveyance channel 238A is mounted to the first surface 234 and the second outer conveyance channel 238B is mounted to the second surface 236. The outer conveyance channels 238A and 238B can include belted motor driven rollers or similar conveyance surfaces.

The rotatable member 200 includes a drum 242 supported by wheeled rotation supports 246 and rotated by a motor 244. The motor 244 is coupled with the drum 242 via a driving cable 248. The motor 244 rotates the drum 242 from a first orientation (e.g., indicia 270A is located at the top of the drum 242) to a second orientation (e.g., indicia 270B is located at the bottom of the drum 242). The drum 242 can rotate in direction 280A (e.g., counterclockwise) from the first orientation to the second orientation.

Turning to an illustrative example, FIG. 2 shows the rotatable member 200 at the first orientation (with indicia 270A located at the top of the drum) after an inventory bin 110 containing inventory items 112 has been received by an inner conveyance channel 232. The inventory bin 110 is received with the open side facing up toward indicia 270A. The inventory bin 110 can be moved through the inner conveyance channel 232 by the first surface 234 moving independently, the second surface 236 moving independently, and/or both the first surface 234 and the second surface 236 moving simultaneously. The motor 244 rotates the drum 242 from a first orientation (e.g., with indicia 270A at the top of the drum 242) in direction 280A (e.g., counter clockwise) to a second orientation (e.g., with indicia 270B at the bottom of the drum 242). The drum 242 can rotate while the inventory bin 110 is held in place in the inner conveyance channel 232. However, the drum 242 may rotate while the inventory bin 110 is being moved along the inner conveyance channel 232.

FIG. 3 shows the rotatable member 200 at the second orientation (indicated by indicia 270B located at the bottom of the drum 242) after rotation in direction 280A (e.g., counter clockwise). An empty inventory bin 110 has been received in the outer conveyance channel 238A. The outer conveyance channel 238A can transport the inventory bin 110 through the drum. The outer conveyance channel 238A can transport the inventory bin 110 through the drum 242 without rotating.

The drum 242 is shown as rotating from the second orientation to the first orientation in direction 280B. Direction 280B is shown as being the opposite direction 280A. However, direction 280B can be the same direction as direction 280A. For example, the drum 242 can rotate 180 degrees counter clockwise from the first orientation to the second orientation. The drum 242 can then rotate 180 degrees counter clockwise from the second orientation to the first orientation, making a full 360 degree rotation.

As shown, the rotatable member 200 has not rotated from the second orientation before receiving the inventory bin 110. In various embodiments, the rotatable member can rotate from the second orientation to the first orientation before receiving the inventory bin 110 (e.g., rotating in direction 280B). Additionally or alternatively, the rotatable member 200 can receive an inventory bin 110 in the inner conveyance channel 232 before rotating from the second orientation to first orientation.

Figure 4:
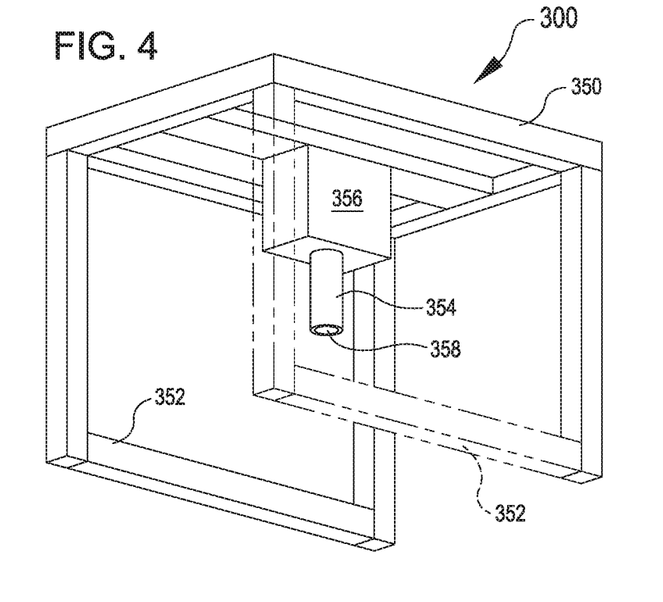
FIG. 4 illustrates an example inventory bin lift assembly that may be utilized in particular embodiments of the inventory handling apparatus shown in FIG. 1.

FIG. 4 illustrates an example inventory bin lift assembly 300 that may be utilized in particular embodiments of the inventory handling apparatus 100 of FIG. 1. The inventory bin lift assembly 300 (hereinafter referred to as the "lift assembly") includes a support frame 350, bin supports 352, a vertical lift 354, and a horizontal mover 356. The bin supports 352 can be on opposing sides of the support frame 350 and spaced apart to leave an open area between them. The bin supports 352 can receive the edges of the inverted inventory bin 110 to allow for the inventory items 112 to be transported from the inner conveyance channel 132 to the output conveyor 160. In some embodiments, the bin supports 352 are aligned with the inner conveyance channel 132 to receive the inventory bin 110.

After the inventory bin 110 has been received on the bin supports 352, the vertical lift 354 can couple with the inventory bin 110 and lift the inventory bin 110 off of the bin supports 352. In various embodiments, the vertical lift 354 raises the inventory bin 110 from the bin supports 352 to the same level as an outer conveyance channel 138. The vertical lift 354 can include a coupler 358 to couple with the inventory bin 110. The coupler 358 can attach to the inventory bin 110 at any location and/or can attach to the bin at an attachment zone on the inventory bin 110.

The horizontal mover 356 can move the bin 110 in a horizontal direction. In some embodiments, the horizontal mover 356 moves the inventory bin 110 horizontally when the inventory bin 110 is being lifted by the vertical lift 354. For example, the vertical lift 354 lifts the inventory bin 110 and the horizontal mover 356 moves the inventory bin 110 in a horizontal direction to deposit the inventory bin 110 into the outer conveyance channel 138. However, the horizontal mover 356 may move the inventory bin 110 when the inventory bin 110 is still in contact with the bin supports 352.

Figure 7:
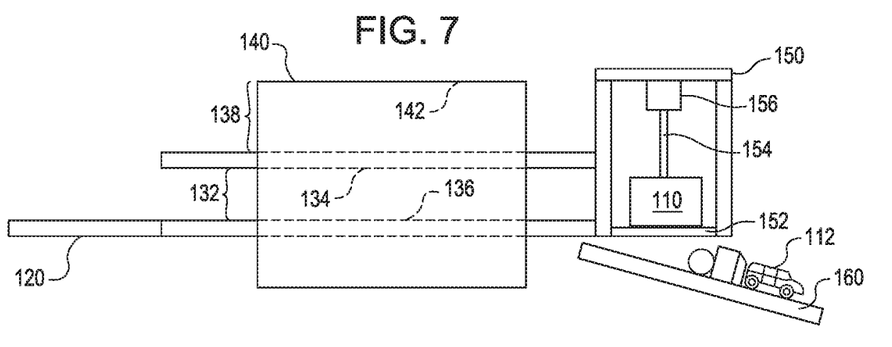
Figure 8:
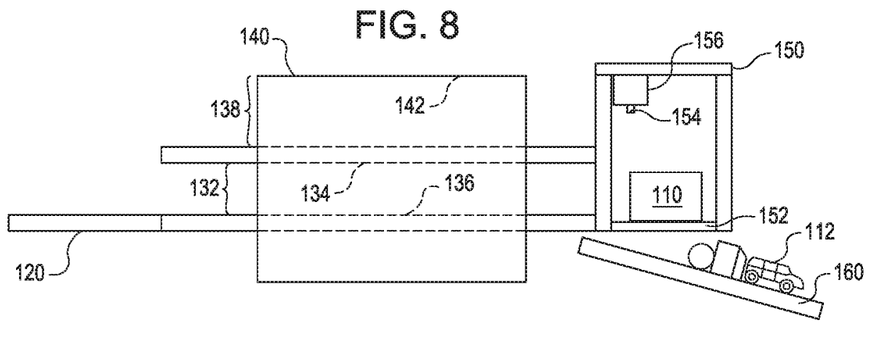
Figure 9:
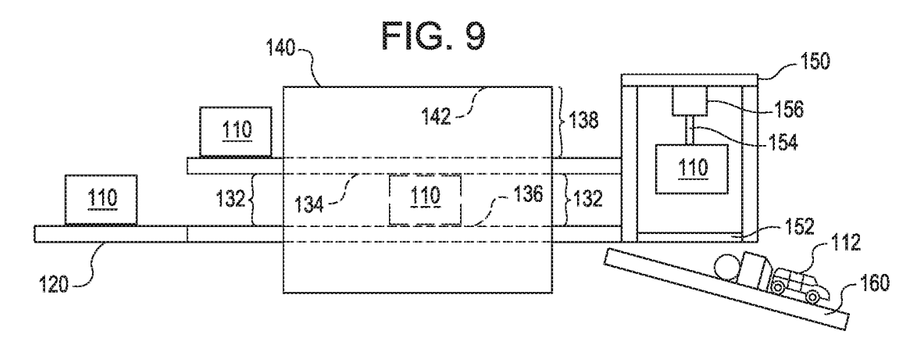

FIG. 5 through FIG. 9 show side views of example stages or states that may be performed by the inventory handling apparatus 100 of FIG. 1. FIG. 5 through FIG. 8 depict a single inventory bin 110 moving through the inventory handling apparatus 100, however, as shown in FIG. 9, multiple inventory bins 110 can be moved through the system simultaneously.

Figure 5:
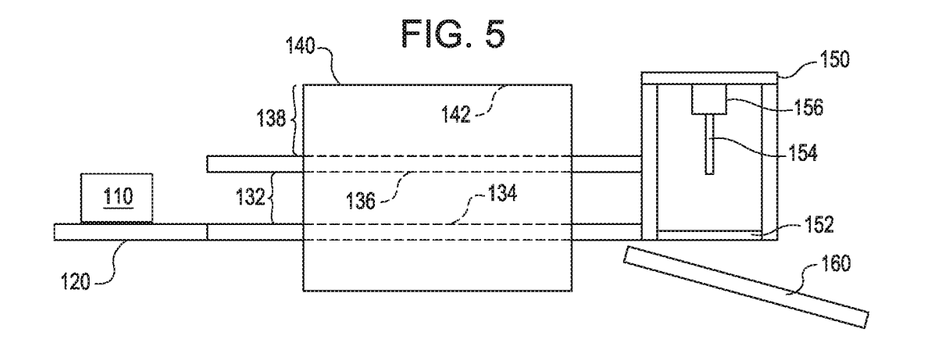
FIG. 5 through FIG. 9 are side views of example stages or states that may be performed by the inventory handling apparatus of FIG. 1.

FIG. 5 shows the inventory handling apparatus 100 receiving an inventory bin 110. The inventory bin 110 is being received into the inner conveyance channel 132 of the conveyance assembly 130. The inventory bin 110 is shown as being transported to the inner conveyance channel 132 by a feeder conveyor 120, however, the inventory bin 110 can be deposited directly into the inner conveyance channel 132. The inventory bin 110 can contain inventory items 112. For example, items a purchaser has ordered through an online portal. The inventory bin 110 can be received by the inner conveyance channel 132 with an open side of the inventory bin 110 facing up. The inner conveyance channel 132 can transport the inventory bin 110 into the rotational member 140 for rotation.

Figure 6:
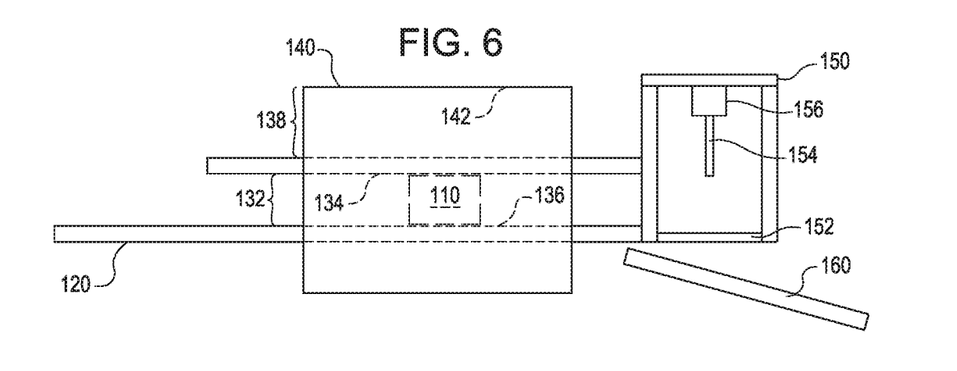

FIG. 6 shows the inventory bin 110 after being transported by the inner conveyance channel 132 into the rotational member 140 and rotated by the rotational member 140. The inventory bin 110 can be transported by a first surface 134 and/or a second surface 136 of the inner conveyance channel 132. In some embodiments, the first surface 134 and the second surface 136 operate together to move the inventory bin 110. The rotational member 140 can rotate the inventory bin 110 until the inventory bin 110 is inverted. For example, if an open side of the inventory bin 110 is facing up before rotation, the open side would be facing down after rotation.

In various embodiments, the rotational member 140 can rotate the inventory bin 110 while the inventory bin 110 is being transported by the inner conveyance channel 132. For example, the inventory bin 110 can be transported from one side of the rotational member 140 to the other side while the rotational member 140 is rotating. The inner conveyance channel 132 can be controlled to move the inventory bin 110 through the rotational member 140 in the same amount of time as it takes to rotate the rotational member 140. However, the inner conveyance channel 132 may move the inventory bin 110 at a faster and/or slower speed.

In some embodiments, the rotational member 140 rotates the inventory bin 110 while the inventory bin is being held in place by the inner conveyance channel 132. The inner conveyance channel 132 may transport the inventory bin 110 partially through the rotational member 140, for example, half-way, and then hold the inventory bin 110 in place. The rotational member 140 may rotate until the inventory bin 110 is inverted and then the inner conveyance channel 132 may continue to transport the inventory bin 110 the rest of the way through the rotational member 140.

The inner conveyance channel 132 can transport the inverted inventory bin 110 out of the rotational member 140 and into the bin lift assembly 150. As shown in FIG. 7, the inventory bin 110 has been received onto bin supports 152. The bin supports 152 can hold the inventory bin 110 above an item conveyor 160, allowing the inventory items 112 to 112 remain on the inner conveyance channel 132. The inner conveyance channel 132 can transport the inventory items 112 to the item conveyor 160.

In some embodiments, an additional conveyance assembly may transport the inventory bin 110 from the inner conveyance channel 132 to the inventory bin lift 150. For example, a set of belted motor driven rollers may be placed between the end of the conveyance channel 132 and the inventory bin lift 150. The inventory items 112 would remain on the belted motor driven rollers after the inventory bin 110 is received by the inventory bin lift 150. The belted motor driven rollers would transport the inventory items 112 to the item conveyor 160.

The inventory bin lift 150 can lift the inventory bin 110. For example, the vertical lift 154 can lift the inventory bin 110 from the bin supports 152 to the outer conveyance channel 138. The inventory bin 110 can be transported via the vertical lift 154 and/or the horizontal mover 156. For example, the inventory bin 110 can be lifted by the vertical lift 154 from the bin supports 152 to the same level as the outer conveyance channel 138. The horizontal mover 156 can then move the inventory bin 110 horizontally to be deposited onto the outer conveyance channel 138.

FIG. 8 shows the inventory bin 110 after it has been deposited onto the outer conveyance channel 138. The outer conveyance channel 138 can transport the inventory bin 110 through the rotatable member 140 between the inner conveyance channel 132 and the drum 142. The rotatable member 140 can receive the inventory bin 110 in the outer conveyance channel 138 before rotating from the second orientation to the first orientation and/or a third orientation. However, in some embodiments, the rotatable member 140 can rotate from the second orientation to the first orientation and/or the third orientation before the outer conveyance channel 138 transports the inventory bin 110 through the rotatable member 140.

FIG. 9 shows an example inventory handling apparatus 100 with multiple inventory bins 110 travelling through the system. Simultaneously, the feeder conveyor 120 can be transporting a first inventory bin 110 to the inner conveyance channel 132. The inner conveyance channel 132 can be transporting a second inventory bin 110 through the rotational member 140 as it rotates to invert the inventory bin 110. A third inventory bin 110 can be raised from the bin supports 152 to the outer conveyance channel 138 by the vertical lift 154. A fourth inventory bin 110 can be on the outer conveyance channel 138, waiting for removal from the system. These actions can be happening in parallel and/or happening in sequence. In some embodiments, some actions may be happening simultaneously with other actions. However, some actions may be happening without other actions happening in the system.

Figure 10:
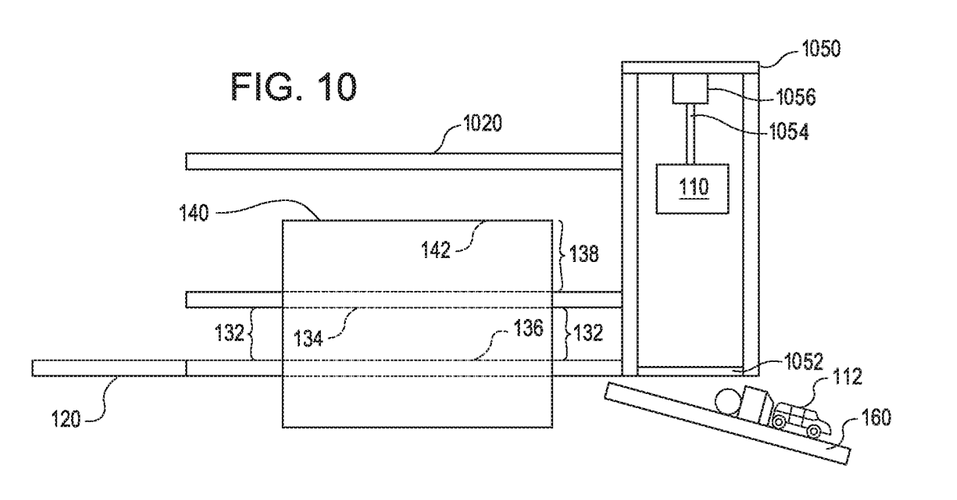
FIG. 10 is a side view of an example inventory handling apparatus including an external conveyor that may be utilized in particular embodiments of the inventory handling apparatus shown in FIG. 1.

FIG. 10 shows an example inventory handling apparatus 100 with an external conveyor 1020. In various embodiments the system can include both the outer conveyance channel 138 and the external conveyor 1020. An inventory bin lift assembly 1050 can transfer the inventory bin 110 to the outer conveyance channel 138 and/or to the external conveyor 1020. In various embodiments, the inventory bin lift assembly 1050 can include bin supports 1052, a vertical lift 1054, and a horizontal mover 1056. The vertical lift 1054 can raise the inventory bin 110 from the bin supports 1052 to the outer conveyance channel 138 and/or the external conveyor 1020. The horizontal mover 1056 can move the inventory bin 110 along a horizontal axis to deposit the inventory bin 110 on the outer conveyance channel 138 and/or the external conveyor 1020.

In some embodiments, the external conveyor 1020 can transport the inventory bins 110 away from the inventory bin lift assembly 1050. The external conveyor 1020 can transport inventory bins 110 simultaneously with the outer conveyance channel 138. However, the external conveyor 1020 and the outer conveyance channel 138 may operate independently to transport the inventory bins 110. For example, the inventory bin lift assembly 1050 can deposit inventory bins 110 by alternating between the outer conveyance channel 138 and the external conveyor 1020. The external conveyor 1020 can be belted motor driven rollers. The external conveyor 1020 may correspond to or comprise, motor driven rollers and/or components used in the inner conveyance channel 132 and/or the outer conveyance channel 138.

In some embodiments, the inventory handling apparatus 100 includes either the outer conveyance channel 138 or the external conveyor 1020. For example, the inventory apparatus 100 can include only the external conveyor 1020. In an illustrative example, the inventory bin lift assembly 1050 receives an inventory bin and transports the inventory bin 110 from the bin supports 1052 to the external conveyor 1020. The external conveyor 1020 receives the inventory bin and transports the inventory bin 110 away from the inventory bin lift assembly 1050.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An inventory handling apparatus, comprising:
   a rotatable member mounted to a support frame for selective rotation relative to the support frame around a rotation axis;
   a motor mounted to the support frame and drivingly coupled to the rotatable member, the motor being controlled to selectively rotate the rotatable member around the rotation axis to a first angular orientation relative to the support frame and to a second angular orientation relative to the support frame, the second angular orientation differing by 180 degrees from the first angular orientation;
   a conveyance assembly mounted to the rotatable member for rotation with the rotatable member around the rotation axis, the conveyance assembly forming an inner conveyance channel centered on the rotation axis and sized to receive an inventory bin containing inventory items and restrain the inventory bin and the inventory items during inversion of the inventory bin via rotation of the rotatable member, the conveyance assembly being operable to convey the inventory bin and the inventory items in a first direction along an inner conveyance channel that extends through the conveyance assembly, the conveyance assembly being operable to convey the inventory bin in a second direction along a conveyance path that does not extend through the inner conveyance channel; and
   an inventory bin lift assembly operable to receive and transfer the inventory bin from the inner conveyance channel for conveyance along one of two outer conveyance channels.

2. The inventory handling apparatus of claim 1, further comprising an inventory item conveyor operable to receive and transfer the inventory items from the inner conveyance channel to a packaging device.

3. The inventory handling apparatus of claim 1, wherein the inventory bin lift assembly comprises bin supports for receiving and supporting the inventory bin and allows the inventory items to pass between the bin supports.

4. The inventory handling apparatus of claim 1, further comprising an output conveyer for receiving and transporting the inventory bin and the inventory items from the conveyance assembly to the inventory bin lift assembly.

5. The inventory handling apparatus of claim 1, further comprising the inventory bin, wherein the inventory bin comprises an attachment area for coupling with the inventory bin lift assembly.

6. The inventory handling apparatus of claim 1, wherein the conveyance path comprises an external inventory bin conveyor separate from the conveyance assembly and external to the rotatable member, the external inventory bin conveyor operable to convey the inventory bin from the inventory bin lift assembly.

7. The inventory handling apparatus of claim 1, wherein the conveyance path comprises one or more outer conveyance channels within the rotatable member that do not extend through the inner conveyance channel.

8. A method of handling inventory items, the method comprising:
operating a conveyance assembly to receive an inventory bin containing inventory items into an inner conveyance channel of the conveyance assembly;
with the inventory bin disposed in the inner conveyance channel, operating the inner conveyance channel to restrain the inventory bin in place and rotating the conveyance assembly from a first orientation to a second orientation to invert the inventory bin; and
operating the conveyance assembly to convey the inverted inventory bin from the conveyance channel to an inventory bin lift assembly.

9. The method of claim 8, comprising:
operating the conveyance assembly to convey the inventory items from the inventory bin lift assembly to an output conveyor; and
collecting a plurality of inventory items on the output conveyor before transporting the inventory items to a second location.

10. The method of claim 8, comprising:
operating the inventory bin lift assembly to transfer the inventory bin to an external conveyor separate from and external to the conveyance assembly; and
operating the external conveyor to convey the inventory bin.

11. The method of claim 8, comprising:
operating the inventory bin lift assembly to transfer the inventory bin to the conveyance assembly; and
operating the conveyance assembly to convey the inventory bin along a conveyance channel separate from the inner conveyance channel.

12. The method of claim 8, comprising:
operating the conveyance assembly to convey the inventory bin from a feeder assembly to the inner conveyance channel.

13. The method of claim 8 comprising:
rotating the conveyance assembly from the second orientation to the first orientation; and
operating the inventory bin lift assembly to transfer the inventory bin to the conveyance assembly.

14. An apparatus, comprising:
a rotatable member supported by a frame and selectively rotatable relative to the frame around a rotation axis from a first angular orientation relative to the frame to a second angular orientation relative to the frame;
a conveyance assembly mounted to the rotatable member for rotation with the rotatable member around the rotation axis, the conveyance assembly forming a conveyance channel centered on the rotation axis, the conveyance assembly operable to convey a received inventory bin containing inventory items along an inner conveyance channel that extends through the inner conveyance channel and restrain the inventory bin and the inventory items during inversion of the inventory bin via rotation of the rotatable member.

15. The apparatus of claim 14, wherein the inventory bin is conveyed along the inner conveyance channel in a first direction and the conveyance assembly is further operable to convey the inventory bin in a second direction along an outer conveyance channel that does not extend through the inner conveyance channel.

16. The apparatus of claim 14, wherein the first angular orientation differs from the second angular orientation by 180 degrees.

17. The apparatus of claim 14, further comprising an inventory bin lift assembly for receiving the inventory bin from the conveyance assembly.

18. The apparatus of claim 17, wherein the inventory bin lift assembly comprises an attachment device for coupling with the inventory bin.

19. The apparatus of claim 14, further comprising an external conveyor separate from the conveyance assembly and external to the rotatable member, the external conveyor operable to convey the inventory bin.

\* \* \* \* \*